United States Patent [19]

Hayashi

[11] Patent Number: 5,459,719
[45] Date of Patent: Oct. 17, 1995

[54] DATA TRANSMISSION CONTROL METHOD AND STATION USED FOR THE SAME

[75] Inventor: Kenji Hayashi, Hadano, Japan

[73] Assignee: Hitachi, Ltd., Tokyo, Japan

[21] Appl. No.: 243,906

[22] Filed: May 17, 1994

[30] Foreign Application Priority Data

May 17, 1993 [JP] Japan ..................... 5-114607

[51] Int. Cl.⁶ .................................. H04L 12/02
[52] U.S. Cl. .................. 370/58.3; 370/60; 370/94.1
[58] Field of Search ............... 370/85.1, 54, 92, 370/93, 94.1, 58.1, 58.2, 58.3, 60; 371/32, 34

[56] References Cited

U.S. PATENT DOCUMENTS

| | | | |
|---|---|---|---|
| 4,792,947 | 12/1988 | Takiyasu et al. | 370/16 X |
| 4,864,559 | 9/1989 | Perlman | 370/60 |
| 4,914,654 | 4/1990 | Matsuda et al. | 370/94.1 |
| 5,117,422 | 5/1992 | Hauptschein et al. | 370/93 X |
| 5,251,214 | 10/1993 | Mertens et al. | 370/92 |
| 5,309,433 | 5/1994 | Cidon et al. | 370/94.1 X |

FOREIGN PATENT DOCUMENTS

| | | | |
|---|---|---|---|
| 100562 | 6/1984 | Japan | H04L 11/00 |
| 124933 | 4/1992 | Japan | H04L 12/18 |

*Primary Examiner*—Douglas W. Olms
*Assistant Examiner*—Russell W. Blum
*Attorney, Agent, or Firm*—Antonelli, Terry, Stout & Kraus

[57] ABSTRACT

A source station writes addresses of destination stations in a data field of a frame, and sends the frame to a data transmission network by using one of those address as a destination address. A station which receives the frame, after writing information in the frame, sends the frame to another station whose address is written in the data field of the send frame and which has not received the frame. These operations are repeated until the frame is sent to all destination stations. Thus, when a frame is sent to a plurality of stations, traffic density can be reduced, and a transfer sequence can be set according to the state of the transmission network and the stations, Further, when a frame cannot be sent to any destination station, information about this failure to send is written in the frame, and the frame is sent to another station which has not received the frame.

18 Claims, 6 Drawing Sheets

DATA TRANSMISSION CONTROL METHOD AND STATION USED FOR THE SAME

BACKGROUND OF THE INVENTION

This invention relates to a data transmission control method for communication using a data transmission network by the multicast systems for communication between one sender station and some specified receiver stations. More specifically, the present invention relates to a data transmission control method capable of reducing traffic density when data is transmitted to some specified destinations, and also relates to a station used under this method.

To give an example of a conventional data transmission control system of this type, there is a known system which collects information about the states of the individual stations by rotating a frame in a loop transmission line in a loop network system having the stations connected in a loop transmission line. In this data transmission system, a station, which is going to collect information about the state of other stations, need not send a frame to each station one by one, and therefore can collect information about other stations efficiently.

A method for managing token ring LAN (Local Area Network) by using a frame with information about a command to request that a specific process be performed at a destination system is shown in pp. 31–39 of IEEE 802.5–1989, but this method can only be used for management communication either in a point-to-point or broadcast transmission.

As a method for sending data to some destinations simultaneously, broadcast is known in LAN technology. Broadcast is a communication technology which transmits many request and response frames to all systems on subnetworks connected by internetworking devices in a whole network.

In LANs of the IEEE 802 family, there is provided means for enabling frames to be received by only stations specified by a "group address", and this scheme poses problems that traffic increases like in the above-mentioned broadcast, that it is necessary to do prior definition of groups that reduces the flexibility of communication, and that since group addresses are limited resources, before it becomes possible to use them, you have to apply to IEEE and pay a specified registration fee.

Referring to a sequentially broadcast data verification system for confirming normal arrival of broadcast data which is transmitted sequentially, as disclosed in JP-A-4-124933, a problem with the conventionally broadcast data verification system is that since the source station sequentially receives confirmation messages from the individual terminals of the destinations of all broadcast data, it is necessary to secure a great amount of line retention time in order to verify transmitted data with the destinations of the broadcast data, which imposes a great load on the source station of broadcast data and the subnetwork connected to the station. For this reason, the sequential broadcast data verification system disclosed in the above-mentioned Patent Office Journal is aimed at solving the above problem by adopting an arrangement that broadcast data is transmitted by a destination that receives the data to the next destination according to the specified sequence until it comes back to the source station.

However, the above-mentioned broadcast technique has a problem that since the frames are sent to areas to which data need not be transmitted, if some systems repeat broadcasting, the traffic rises higher by synergistic effect than in a point-to-point transmission.

Furthermore, in the above-mentioned sequential broadcast data verification system, when sending a broadcast data, the source station generates a broadcast frame having included in its destination field information about the sequence of destinations, and destination stations, as they receive the broadcast frame, sequentially transmit the broadcast frame according to the specified sequence in the destination sequence information. Then, when the broadcast frame is sent back, the source station makes a decision whether or not the broadcast frames sent out and sent back coincide with each other and thereby makes sure that the transmission of the broadcast data has been completed. Therefore, if any of the destinations was unable to receive the broadcast data by some fault or other, the broadcast data is not sent to the subsequent destinations, and the source station cannot make sure whether or not transmission has been completed, which reduces reliability. In addition, when a destination station is unable to receive broadcast data by power supply being off or the line being busy or the like, there is a possibility that the station is ready to receive by retry after passage of some time. In the above-mentioned sequentially broadcast data verification system, however, since a transfer sequence is decided when the source station broadcasts data, the system is lacking in flexibility such that the transfer sequence be decided according to the condition of the destinations, for example.

SUMMARY OF THE INVENTION

The present invention has been made in view of the above-mentioned situation, and has as its objects to solve the above-mentioned problems, make it possible to reduce traffic when sending data or requesting processing to specified destinations or collecting information from specified destinations, enable a transfer sequence to be set according to the condition of the transmission network or the stations, and provide a data transmission control system superior in reliability and flexibility. Other objects of the present invention will be apparent by the following description.

The above objects will be achieved by a data communication control method and apparatus which performs the following steps:

(a) when, in a data transmission network, a station sends a frame to the other stations, this source station lets address information about the respective destination stations along with data be written in the frame, and sends the frame to the data transmission network so that the frame is transmitted using address information about a destination station which has not received said frame as a next destination address;

(b) the station specified by the above-mentioned destination address receives the frame and acquires the data, and after writing this reception in the frame, sends the frame to any station, which has not received the frame, at another address obtained from the information about the destination addresses and the reception of the frame; and (c) step (b) is repeated sequentially to all of the destination stations to send the frame to all specified stations so that the data is delivered to all of them.

The effects of the data transmission control method and apparatus according to the present invention will be summarized in the following.

Data is delivered by a bucket brigade system in which the destination address in the control field of the frame is replaced sequentially by any one of the specified undelivered destination addresses stored in the data field and, therefore, data can be sent with reduced traffic. More specifically, when request and response frames are transmitted to and from N stations in an ordinary point-to-point transmission, the number of times of frame transmission is 2 * N. On the other hand, in the data transmission control method and apparatus according to the present invention, in a case where a frame is sent back to the source station in the end, the number of times of frame transmission is N +1, which means half as many as in the conventional technology.

In the data transmission control method and apparatus according to the present invention, since broadcast is not used, traffic never becomes abnormally dense nor do responses come together.

Moreover, in the data transmission control method according to the present invention, stations, when they receive a frame, write the reception in the frame and then send it to the next station. Therefore, it is easy to confirm whether or not transmission has been completed and a transfer sequence arbitrarily set, so that it is possible to provide a data transmission control method and apparatus excellent in reliability and flexibility.

DESCRIPTION OF THE PREFERRED EMBODIMENTS

In the data transmission control method and apparatus according to the present invention, a frame used in a data transmission network includes a control field for describing address information or the like necessary for communication and a data field for describing information to be sent to destination systems. The destination of a frame is a system designated by destination address information written in the control field.

More specifically, the source station lets addresses of the stations as data destinations along with send data be written in the data field of the frame. Data sent to the respective addresses may be different data or common data. One of those addresses is set initially as the destination address in the control field. The address to which the frame is sent is a station whose address has been set in the control field. A station which receives the frame acquires data accompanied by the address of this destination, and after writing the reception in the frame, replaces the destination address set in the control field with the address of a station which has not received the frame out of all addresses stored in the data field, and then transmits the frame to the other station with the new address.

Data can be delivered to all stations by performing a cycle of frame reception, data acquisition, destination address updating and transmission, which cycle starts with the first sending of a frame from the source station to another station, and repeating this cycle in a point-to-point transmission with low traffic density until the frame is sent to all the specified stations in the address list.

In the above-mentioned basic arrangement, one of the destination addresses is always set in the control field which is the same as the existing one, and this is intended to minimize the modification of the system and prevent the existing network system from being intolerably affected by this arrangement. Therefore, all destination addresses may be set previously in the control field, and data delivered in the above-mentioned manner by the bucket brigade system, in other words, multicast for sequential data transfer can be performed.

Out of the addresses in the data field of a frame, which address is to be used as the next destination can be decided, for example, by the following methods.

A first method is to transmit a frame according to an arranged sequence of address information written in the data field or the control field. This method is effective in a case where the source station is cognizant of the physical position on the transmission network of all destination stations and the source station can set the transfer sequence such that the transmission cost is minimum.

The second method is, when the network is formed by some groups, to first select a station which has not received a frame in a group according to the physical position in the transmission network, and if there is no station which has not yet received the frame in the group, select a station which has not received the frame in another group. By this method, the transmission cost can be reduced in a large-scale network.

A third method is for the receiving station to select the next destination based on its processing result. This method is effective in a case where the processes of the respective destination stations are related with one another and the contents of processing and whether to execute processing or not are decided by processing results at one station. Out of the addresses written in the data field of a frame, to which station the frame has been sent can be known through the position of the destination address list in the frame which is modified its sequence by the receiver station based on the processing result when the frame is transmitted according to the arranged sequence of address information written in the data field or the control field. It ought to be noted that other techniques for confirming whether or not communication is possible may be used.

Besides, in the present invention of this patent application, the stations to which a frame has been sent is known with the following methods.

A first method of this invention is to have a field for showing either reception completed or not completed, that is, whether or not the station received the frame added to a set of address and data in the data field or the control field of a frame, and reference the field when transmitting.

A second method of this invention is for a station having received a frame to erase a set of its address and data in the data field or the control field of a frame. Therefore, the remaining sets of address and data are of the stations which have not received the frame.

In addition, by putting a mark to a frame, whether or not a station has already received the frame can be known.

On the other hand, the source station can know the stations to which frame transmission was successful and the stations to which frame transmission failed by the following techniques.

A first technique is, when a frame could not reach a station at a specified address, for the station, which tried to send the frame, to write information for identifying a station which the frame failed to reach and the failure that occurred as information accompanying the address in the data field of the frame. The above-mentioned frame is sent back to the source station eventually after the frame has been sent to all the stations to which the frame can be transmitted.

A second technique is for a station which received a frame to write information showing the fact that the station received data normally in the frame, and after delivering the frame to all stations which are communicable, sends the frame back to the source station eventually.

A third technique is for each station to send back a confirmation response to the source station each time any station receives a multicast frame.

By those techniques, the source station can know the stations to which frame transmission succeeded and the stations to which frame transmission failed. It ought to be noted that other techniques for confirming whether or not communication is possible may be used.

When a command for requesting that processing should be executed at the destination station is included in data to be transmitted, processing results for each address can be included in the frame. By so doing, the source station can make a station specified by an address collect or set information or take a specified action. In the data transmission control method according to the present invention, compared with a simple point-to-point transmission, a somewhat longer time is taken. To obtain a quicker response, the following approaches are effective.

A first approach is to send back a multicast frame to the source station at the time-out of a set period. This approach is effective in a case where a response is to be obtained quickly even if there remains a station to which data is not yet sent.

A second approach is to send back processing results of a command or the like one after another to the source station each time a station receives a multicast frame.

Preferred embodiments of the present invention will be described in detail with reference to the accompanying drawings.

Figure 1:
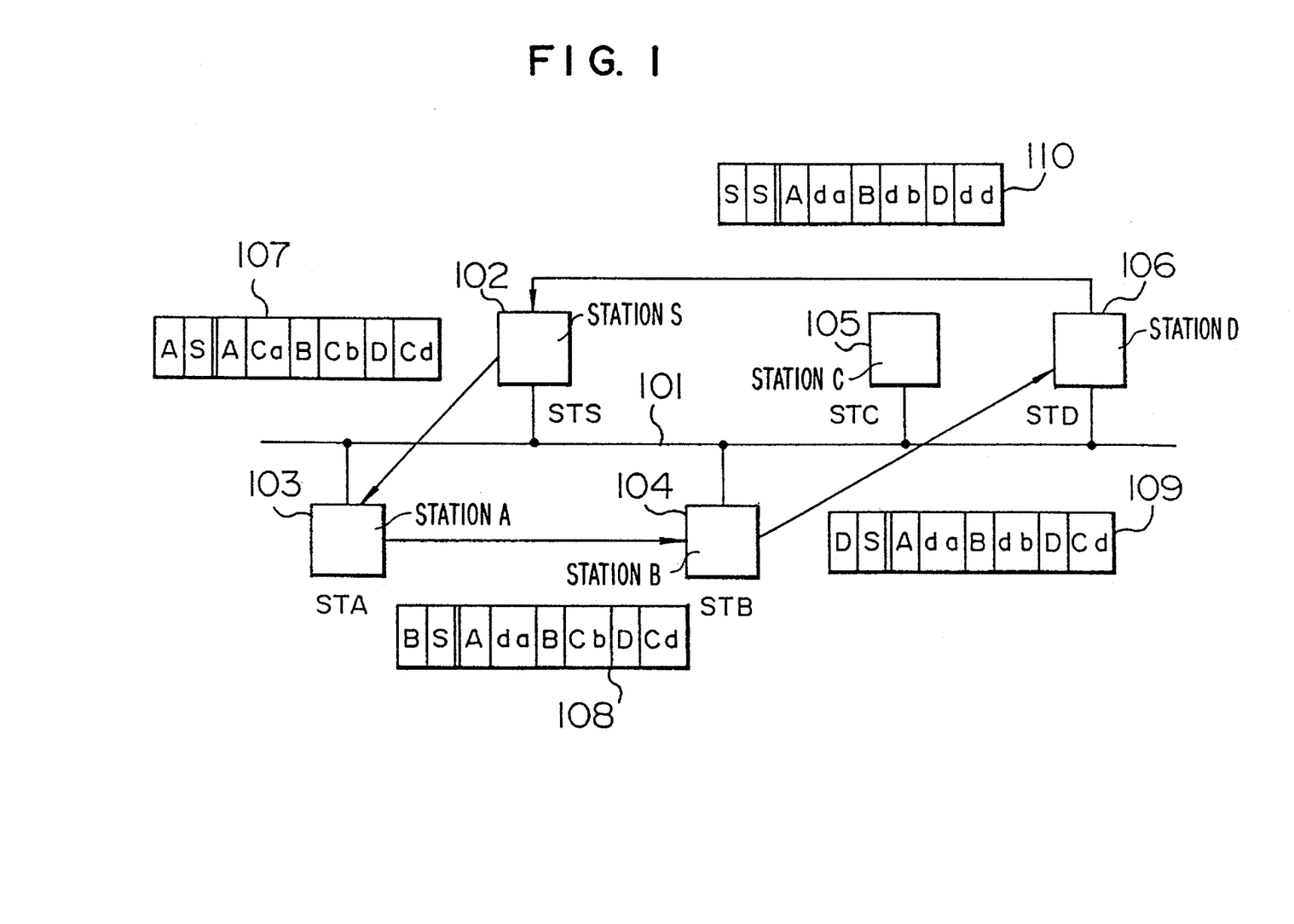
FIG. 1 is a diagram showing an example of operation of a network management system using multicast of frame on a LAN to which the present invention is applied.

FIG. 1 shows an example of operation of a network management system using a multicast of a frame on a LAN to which the present invention is applied. In an environment that stations 102 to 106 are connected on LAN 101, the stations are assigned addresses S, A, B, C and D, respectively. Supposing that the stations are in the communicable condition, a multicast operation using the station 102 as the source station will be described. In the following description, as codes for the stations 102, 103, 104, 105, and 106, STS, STA, STB, STC and STD are used. To show a concrete example, a network state management application will be described. Let STS be a network management system, and let STA, STB, STC and STD be managed systems. The operation of collecting state information by accessing STA, STB, and STD from STS is described below.

STS sends a multicast frame 107 having A for a destination address and S for a source address written in the control field, and A, B and C for destination addresses of STA, STB and STD and state information collection commands Ca, Cb and Cd written in the data field. STA receives the frame 107 and then acquires a command Ca addressed to STA station. STA sets the state information da of STA, specified by Ca, in the frame 107. Subsequently, out of the addresses in the received frame 107, STA writes an address of a station, to which the frame is to be transmitted, in the destination address of the control field of the frame 107, and sends out the frame which is now designated as a frame 108. There are a number of methods for selecting the next station. The simplest way is to determine the address adjacent on the trailing end side of the frame to the address A as the next station to which the frame is to be sent. The address B is written in the destination address of the control field of the frame 107, and the frame 108 is sent out. In the case of a large-scale network having a plurality of LANs connected through public data network, by selecting a station within a LAN to which the sending station belongs as the first candidate for the next station or by selecting a station outside the above-mentioned LAN when there is no station which has not yet received a frame within that LAN, the transmission cost and time can be reduced.

Likewise, STB receives the frame 108, and after setting a state information db of STD in the frame 108 by processing the command Cb and transmits a frame 109 having D set therein as the destination address.

STD receives the frame 109 and set a state information dd of STD in the frame 109 by processing the command Cd. STD, when recognizing that there is not any more address of destination on the trailing end side of the frame, decides that the station STD is the final station of multicast, and transmits a frame 110 in which the destination address is updated to the source address S.

In the manner as described above, the network management system STS executes frame multicast to the specified three stations on the LAN, and can obtain state information da, db and dd.

Figure 10:
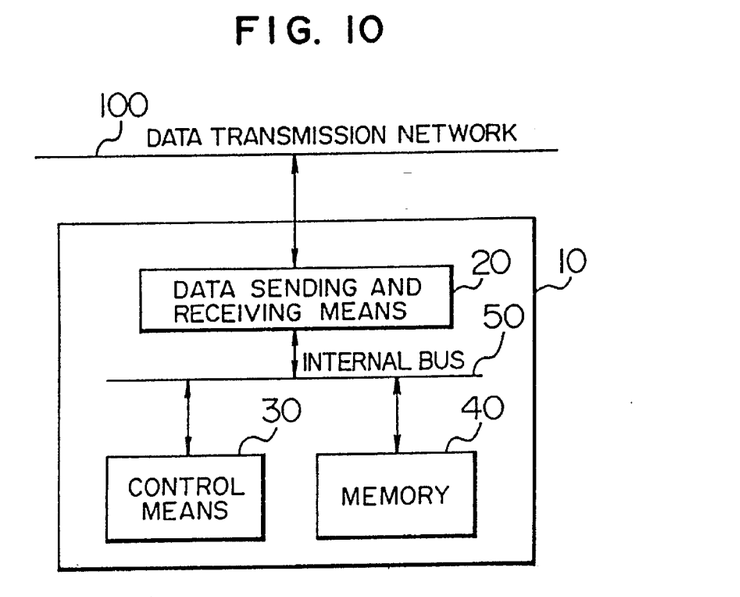
FIG. 10 is a block diagram of a portion of a station which is related to data transmission.

FIG. 10 is a block diagram of each station. Note that in FIG. 10, only components related to data transmission are shown. A station 10 comprises a data sending/receiving means 20, a control means 30, and a memory 40, and those components are interconnected through an internal bus 50. The data sending/receiving means 20 sends and receives data to and from the data transmission network 100, and acquires data addressed and sent to itself. The control means 30 processes data that the data sending/receiving means 20 received from the data transmission network 100 and arranges it, if necessary, into data to be sent via the sending/receiving means 20 to the network 100. The memory 40 stores therein transmitted data and various items of information.

The arrangement of a frame in the present invention will next be described with reference to FIGS. 2, 3 and 4.

Figure 2:
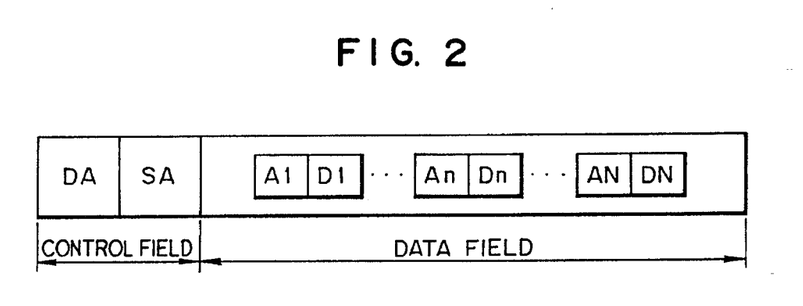
FIG. 2 is a diagram showing an example of the most basic arrangement of a frame in the present invention.

FIG. 2 shows an example of the most basic arrangement of a frame. A frame includes a control field and a data field. In the control field, a destination address (DA) and a source address (SA) are set. In actuality, in addition to those addresses, information necessary for control of frame transmission and reception (e.g., frame check, delimiter, etc.) is written in a frame, but this is omitted for simplicity of description.

Moreover, in the data field, N addresses A1, A2, ... AN for sending N items of data D1, D2, ... DN are written along with data in pairs.

Note that, in the above case, if data D1 through DN are the same, arrangement may be made to set one item of common data.

Figure 3:
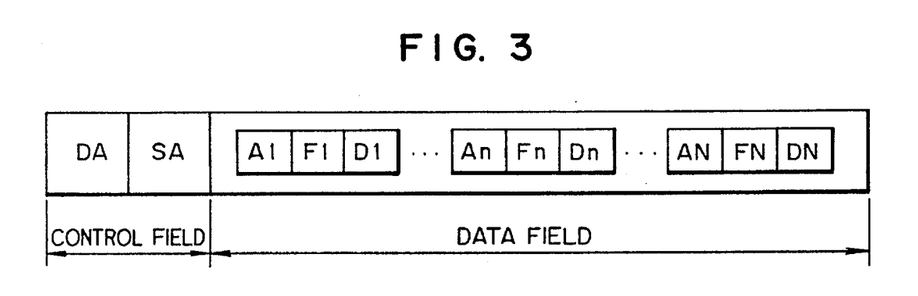
FIG. 3 is a diagram showing an example of another arrangement of a frame in the present invention.

FIG. 3 shows an example of arrangement made by attaching additional information to the frame shown in FIG. 2. More specifically, a transmission flag (Fn) is added to the data field of the frame shown in FIG. 3. The transmission flag Fn carries information to show a station that received a frame normally or a station that a frame failed to reach out of addresses specified in the data field. The transmission flag Fn takes any of three states: "reception not completed (value 0)" or "reception completed", or "not-reacheable". By this arrangement, even when it is impossible that the frame cannot reach some station but a frame is sequentially transmitted to other stations, the source station can easily make sure whether or not sending has been completed for each station. Also, since the source station can directly know whether or not reception has been completed for each station, a transfer sequence can be set arbitrarily. Therefore, it is possible to provide a data transmission control method superior in reliability and flexibility.

Figure 5:
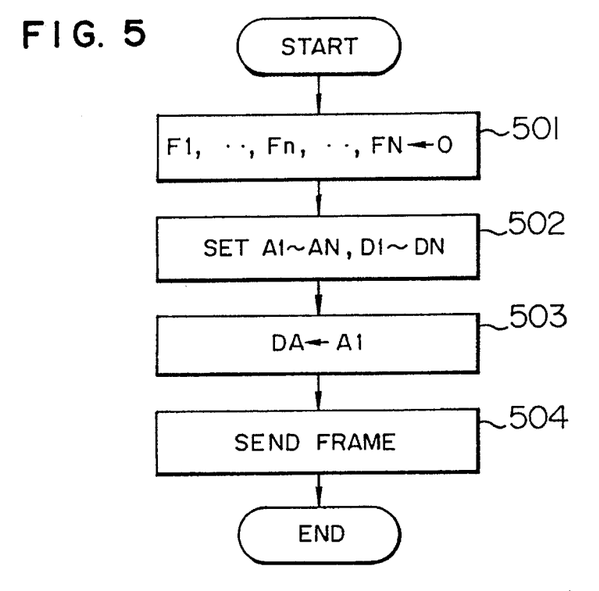
FIG. 5 is a flowchart showing an example of basic operation of source station for sending a multicast frame in the data transmission control method according to the present invention.

FIG. 5 is a flowchart showing an example of basic operation of the source station for sending a multicast frame in the data transmission control method according to the present invention.

In the source station, "0" is set as an initial value at the transmission flags F1, ... , Fn, ... , FN (see FIG. 3)(step 501). In the data field of the frame, N items of send data D1 through DN and N addresses A1 through AN are set (step 502).

For the destination address DA of the control field, A1 is set as an initial value (step 503). When those settings have been completed, the frame is sent out (step 504).

Figure 6:
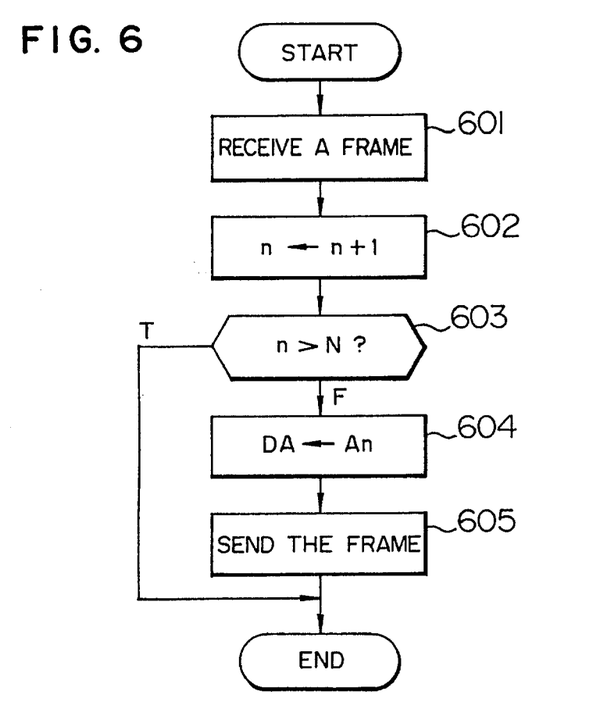
FIG. 6 is a flowchart showing an example of basic operation when receiving a multicast frame in the data transmission control method according to the present invention.

FIG. 6 is a flowchart showing an example of basic operation when receiving a multicast frame in the data transmission control method according to the present invention.

A receiving station at address An receives a frame whose destination address is An (step 601). The receiving station, after acquiring data Dn, checks if n+1 is greater than the number of addresses N (steps 602, 603). This check is made to see if the receiving station is the last of the multicast destinations. The destination of frame transmission by the receiving station An is an address adjacent on the trailing end side of the frame to the station An out of a string of address data in the data field of the frame, in other words, the station at an address A(n+1).

When n+1<N, A(n+1) is set at a destination address DA, and the frame is transmitted to this address (steps 604, 605).

Description has been made of an example of basic operation in sending and receiving a multicast frame in the data transmission control method according to the present invention.

Figure 7:
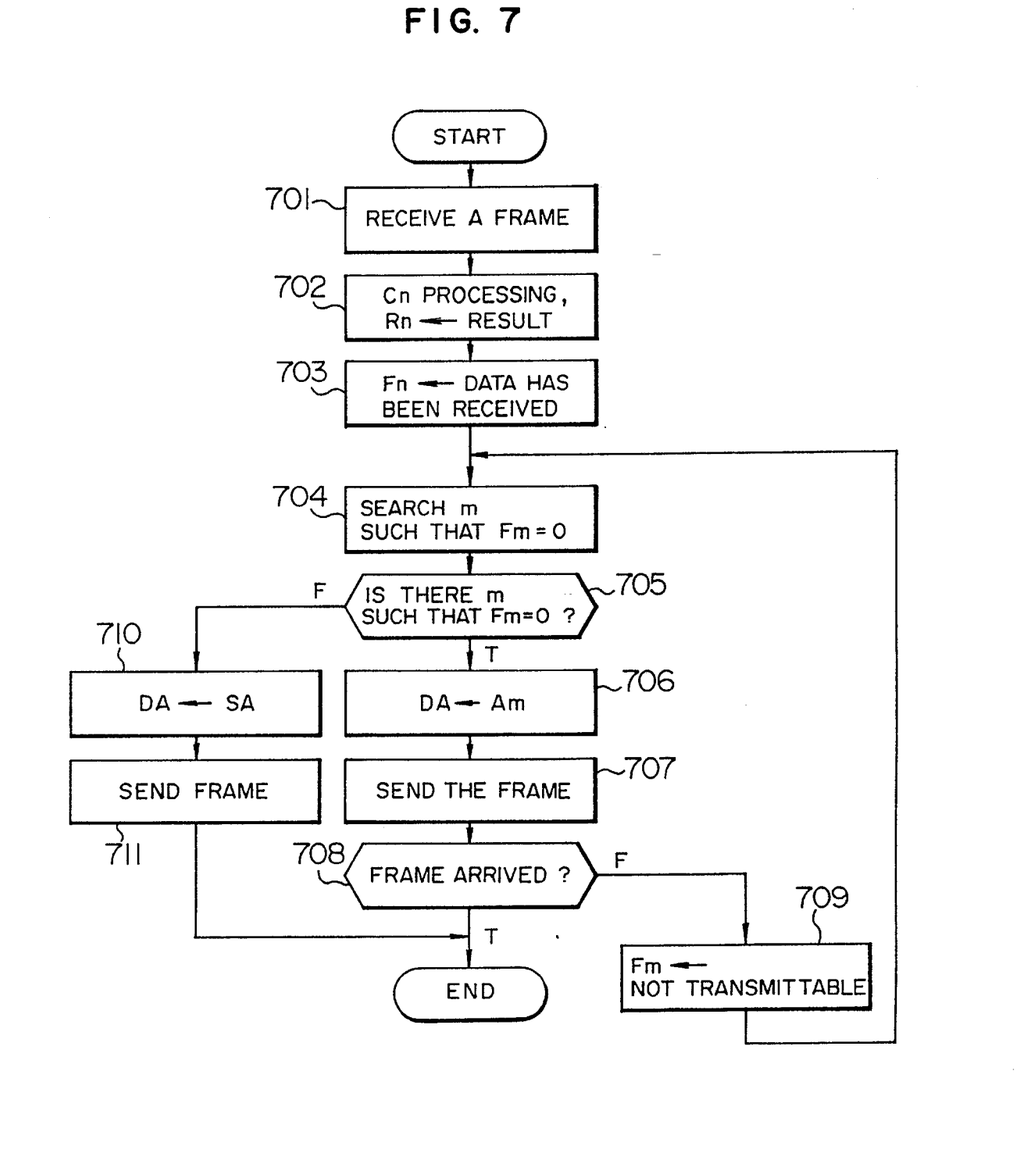
FIG. 7 is a flowchart showing an example of a sending/receiving operation of a multicast frame according to another embodiment of the present invention.

Other operation examples will then be described. FIG. 7 is a flowchart showing the operation of a multicast frame by using a frame keeping operation command to a station and information about result data collection and transmission state (success or failure) or the like.

Figure 4:
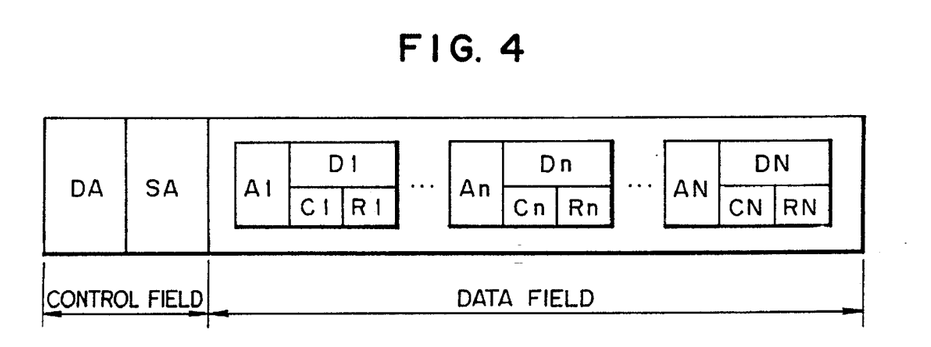
FIG. 4 is a diagram showing an example of yet another arrangement of a frame in the present invention.

FIG. 4 shows an example of the most basic arrangement of a frame used in this embodiment. Data Dn corresponding to each address of the data field includes a Cn field of command information and an Rn field for storing a result of processing Cn.

A station An having an address An receives a frame whose destination address in the control field is An (step 701). The station An receives the command information Cn, and stores a result Rn of processing Cn in the data field of the frame (step 702). Examples of command information Cn may be network management commands to set communication parameters, collect structure information, execute tests, collect station state information, change operating condition, etc. along with data for use with ordinary host software. Possible examples of Rn include information about a station An specified by a command Cn to collect various items of information, result (success or failure) of execution of Cn, and test result information.

The station An sets a transmission flag Fn to a value representing completion of transmission to indicate that it received data of the frame normally (step 703). Subsequently, check is made to see if Fm=0, in other words, to make sure if there is a station Am to which the frame has not been transmitted (step 704).

When there is m which satisfies Fm=0, Am is set in the destination address DA and the frame is sent (steps 706, 707). When there is not m which satisfies Fm=0, this means that the frame has been sent to all addresses in the data field of the frame. Therefore, the address SA of the source station is set in the destination address DA of the frame and the frame is sent to DA.

On the other hand, the station An knows by means such as acknowledge response ACK of the protocol whether or not the frame it had sent reached the specified destination Am (step 708). If the frame reached Am, the process is finished. If the frame did not reach Am, a value representing impossibility of transmission is set Fm (step 709), steps starting with 704 are performed again. Possible reasons why a frame is unable to reach a station specified by the destination address are that the power supply of the station is cut off or that there is some fault in the route leading to the station.

Another embodiment of the present invention will be described in the following.

Figure 8:
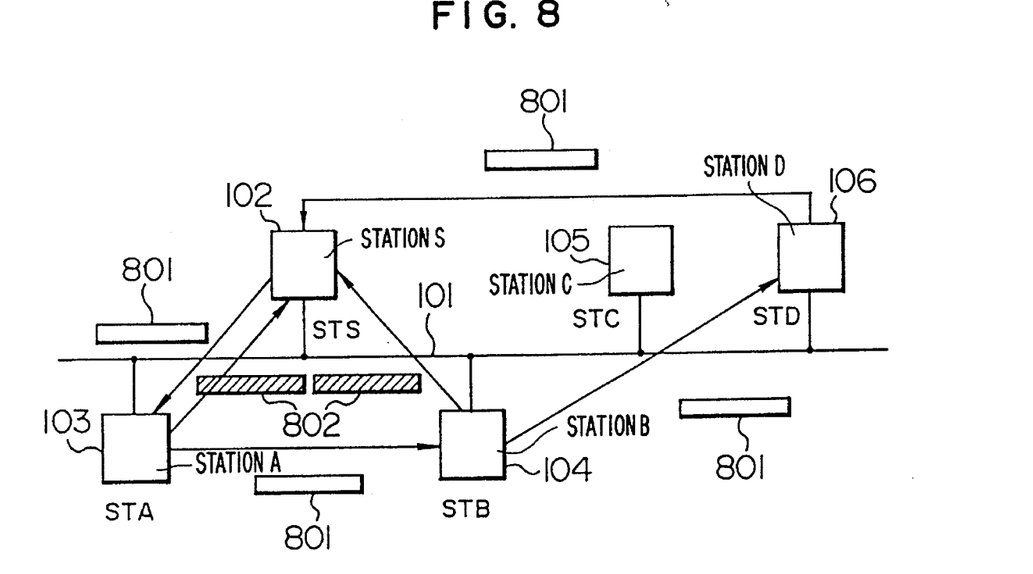
FIG. 8 is a diagram showing an example of operation of a network management system using a multicast frame according to the above-mentioned one other embodiment.

FIG. 8 is a diagram showing an example of operation of a network management system using a multicast frame wherein the state of reception is reported from the destination stations to the source station one after another when they receive a frame. A source station STS 102 sends a request frame 801 including addresses A, B and D for destination stations STA 103, STB 104 and STD 106 to a station STA 103. STA 103, when receiving the frame 801 normally, sends back a response frame 802 having information about the normal reception to STS 102, and forwards the request frame 801 to STB 104. Likewise, STB 104 informs STS 102 of normal reception of the frame 801, and forwards the frame 801 to STD 106. STD 106 may do a similar notification of normal reception of the frame to STS 102, but STD 106 need not do that because STD 106 is the final station, STD 106's sending the frame 801 to STS 102 also serves as that notification.

Moreover, description will be made of an operation that the destination stations, when receiving a frame, successively report a result of processing to the source station by another frame in response to a request for processing in a case where a request for processing to the destination stations is included in data in a frame. In this case, the destination station STS 102 sends the request frame 801 having the addresses of the destination stations STA 103, STB 104 and STD 106 and a processing request (command). STA 103 reads a processing request from the frame 801 it received, and executes processing. STA 103 sends back the processing result to STS 102 by using the response frame 802, and forwards the request frame 801 to STB 104. STB 104 executes processing same as mentioned above. STD 106, too, carries out the same processing, but being cognizant of its being the final-destination, STD 106 sends back to STS 102 the request frame by having the result of specified processing written in the frame. Needless to say, STD 106 may execute the same processing as STB 104, but, as mentioned above, need not do that because STD 106's sending the request frame 801 to STS 102 also serves as confirmation of normal reception of the frame.

According to this embodiment, it is possible for STS 102 to know the state of arrival of a multicast frame for each destination station and a result of command processing quickly as information about these is given to STS 102 each time the multicast frame is processed by any of the destination stations.

Yet another embodiment of the present invention will be described.

Figure 9:
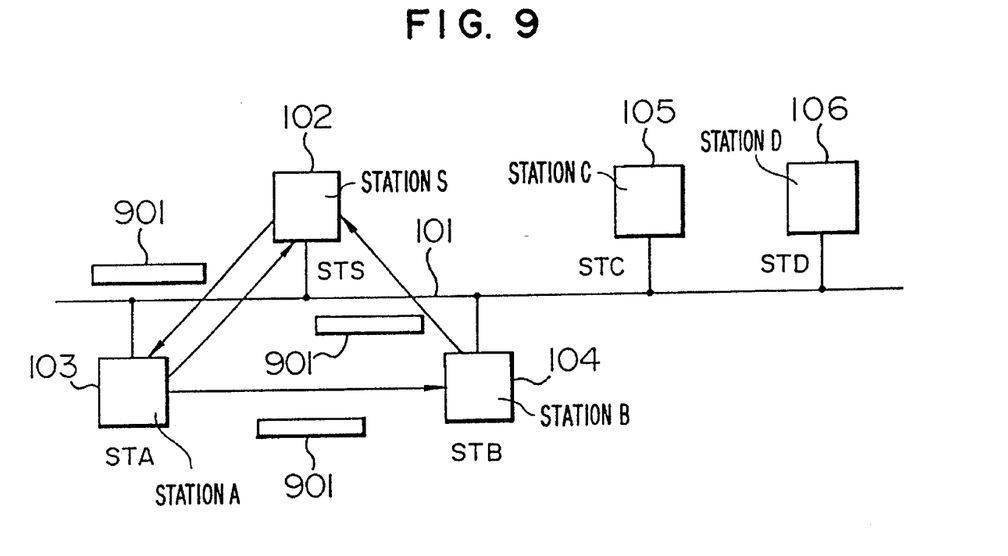
FIG. 9 is a diagram showing an example of operation of a network management system using a multicast frame according to yet another embodiment.

FIG. 9 is a diagram showing an example of operation of a network management system using a multicast frame according to an embodiment in which a station which received the frame sends back the frame to the source station within a specified time.

A source station STS 102 sends to a station STA 103 a multicast frame 901 having addresses A, B and D for destination stations STA 103, STB 104 and STD 106 along with a permissible time T until the frame is sent back.

STA 103 subtracts time Ta necessary for reception and processing of a frame 901 and transmission of the frame to STB 104 from the above-mentioned time T, and makes sure that this "T–Ta (should be >0)" is greater than 0, replaces time T written in the frame 901 with T–Ta, and sends the frame 901 to STB 104.

Likewise, STB 104 subtracts time Tb necessary for reception and processing of the frame 901 and transmission to STD 106 from the above-mentioned "T–Ta", calculates "T–Ta–Tb (should be <0)", and when it recognizes that this is less than 0, sends back the frame 901 to STS 102 without sending to the remaining destination STD 106.

STS 102 recognizes from the value of T–Ta–Tb that the frame return maximum permissible time of the frame 901 has run out, and also recognizes from the record of the receiving stations that the frame has not been sent to STD 106.

According to those embodiments mentioned above, without using broadcast, it is possible to obtain effects that data is sent to a plurality of destinations or data is collected from them with reduced traffic volume and reduced time-wise and space-wise traffic densities.

Another effect is that processing load in the source station is decreased because it needs not execute a transmission procedure for each of the destination station.

It ought to be noted that each embodiment mentioned above shows only an example, and the present invention is not limited to those embodiments.

As has been described in detail, the present invention provides a notable effect that a data transmission method can be realized which can reduce traffic in cases where it is necessary to send data and a request for processing to a plurality of specified destinations or collect information from the specified stations.

What is claimed is:

1. A data transmission control method in a network system which includes a plurality of stations connected by a data transmission network, comprising the steps of:

(a) writing address information about destination stations of said plurality of stations along with data in a frame from a source station, selecting one of said destination stations as a first destination station, and sending said frame to said data transmission network so that said frame is transmitted using address information about said first destination station as a first destination address;

(b) receiving said frame and acquiring said data in said first destination station, and selecting, after writing information concerning this reception in said frame, one of said destination stations which have not received said frame as a next destination station, and sending said frame to said data transmission network so that said frame is transmitted using address information about said next destination station as a next destination address; and (c) receiving said frame and acquiring said data in said next destination station, and selecting, after writing information concerning this reception in said frame, one of said destination stations which have not received said frame as another next destination station, and sending said frame to said data transmission network so that said frame is transmitted using address information about said another next destination station as another next destination address.

2. A data transmission control method according to claim 1, wherein a destination station is selected according to physical positions or topology of said destination stations in said data transmission network.

3. A data transmission control method according to claim 1, further comprising the step for letting information indicating said destination station which said frame failed to reach be written in said frame from the station which tried to send said frame to said destination station, and transmitting said frame to another of said destination stations which are ready to receive.

4. A data transmission control method according to claim 1, wherein, when sending said frame from said destination station a command for a process which each said destination station is requested to execute is written as said data for each destination station in said frame.

5. A data transmission control method according to claim 4, further comprising the step of:

writing a result of processing said command in said station in said frame, and thereafter sending said frame back to said source station from all of said destination stations which successfully received said frame.

6. A data transmission control method according to claim 1, wherein after receiving said frame in all of said destination stations ready to receive said frame, said destination station which received said frame last sends said frame back to said source station.

7. A data transmission control method according to claim 1, wherein, when receiving said frame, said destination stations successively report a state of reception to said source station.

8. A data transmission control method according to claim 1, wherein said destination stations which have received said frame successively report on a result of processing indicated in said data of said frame to said source station by using another frame.

9. A data transmission control method according to claim 8, wherein in the step that said destination station sends said frame, when said destination station which has received said frame selects one of said destination stations which have not received said frame, this selection is made based on a result of processing a command at said destination station that received said frame.

10. A data transmission control method according to claim 1, further comprising the steps of:
specifying a time to send back said frame to said source station in said frame before said source station sends said frame;
replacing, in said destination station which received said frame, before sending said frame, said specified time value with a value obtained by subtracting a processing time at this station from said specified time value; and
sending back in said destination station which has received said frame, when said specified time in said frame becomes smaller than 0 before sending said frame, said frame to said source station.

11. A station for controlling data transmission comprising:
data sending and receiving means, connected to a data transmission network, for sending and receiving a frame to and from said data transmission network and accepting said frame which is addressed to said station;
control means for processing said frame received by said data sending and receiving means from said data transmission network, generating said frame, and sending said frame from said data sending and receiving means to said data transmission network;
memory means for memorizing said frame and information which include at least information for controlling said station; and
an internal bus to which said data sending and receiving means, said control means and said memory means are connected,
wherein said control means includes:
first sending control means for writing data and address information for each of a plurality of destination stations in said frame to be sent to said plurality of destination stations connected to said data transmission network, and sending said frame to said data transmission network so that said frame is transmitted using address information of one of said plurality of destination stations as an address of a first destination station, and
second sending control means for receiving said data, addressed to said station, in said frame sent to said plurality of destination stations and received by said data sending and receiving means, and after writing information concerning the reception in said frame, selecting one of said destination stations which have not received said frame as a next destination station, and sending said frame to said transmission network by using address information about said next destination station as a next destination address of said next destination station.

12. A station for controlling data transmission according to claim 11, wherein said second sending control means, when selecting one of said destination station which have not received said frame, selects according to physical positions or topology of said destination stations in said data transmission network.

13. A station for controlling data transmission according to claim 11, wherein said second sending control means decides whether said frame successfully reached said next destination station based on an acknowledge response from said next destination station, when said frame failed to reach said next destination station for some reason, and writes information indicating said next destination station which said frame failed to reach in said frame, and transmits said frame to another of said destination stations.

14. Station for controlling data transmission according to claim 11, wherein said first sending control means writes a command for a process that each destination station is requested to execute as said data for each destination station in said frame.

15. A station for controlling data transmission according to claim 11, wherein said first sending control means includes means for sending said frame by setting a time value representing a period of time until said frame is sent back to a source station in said frame before sending said frame to said first destination station; and
wherein said second sending control means includes means for replacing said set time value with a value obtained by subtracting processing time at said station from said set time value before sending said frame to said next destination station, and means for sending back said frame to said source station when a time specified in said frame becomes smaller than zero (0) before sending said frame.

16. A station for controlling data transmission according to claim 11, wherein said second sending control means sends back said frame to a source station of said frame, when all of said destination stations have received said frame.

17. A data transmission control method in a network system which includes a plurality of stations connected by a data transmission network, comprising the steps of:
writing address information about respective destination stations of said plurality of stations as a part of data in a frame from a source station;
selecting one of said destination stations to send said frame as a first destination station;
sending said frame to said first destination station via said data transmission network using address information about said first destination station;
receiving said frame sent by said source station to acquire said data in said frame in said first destination station;
writing reception information about this reception by said first destination station in said frame;
selecting one of said destination stations which have not received said frame as a next destination station using address information of said next destination station and said reception information;
sending said frame to said next destination station via said data transmission network using said address information of said next destination station;
receiving said frame sent by said first destination station to acquire said data in said frame in said next destination station;
writing reception information about this reception by said next destination station in said frame;
selecting one of said destination stations which have not received said frame as another next destination station using address information of said another next destination station and said reception information; and sending said frame to said another next destination station via said data transmission network using said address information about said another next destination station.

18. A data transmission control method according to claim 17, wherein in each of said sending steps the station sending said frame decides whether said frame successfully reached the destination station based on an acknowledge response from the destination station, and when said frame failed to reach the destination station for some reason, writes information indicating the destination station which said frame failed to reach in said frame, and sends said frame to another of said plurality of destination stations.

* * * * *